May 2, 1933.  H. A. TOULMIN, JR  1,906,672

EYEGLASS LENS

Filed Sept. 16, 1930

INVENTOR
Harry A. Toulmin Jr.
BY Toulmin & Toulmin
ATTORNEY

Patented May 2, 1933

1,906,672

UNITED STATES PATENT OFFICE

HARRY A. TOULMIN, JR., OF DAYTON, OHIO, ASSIGNOR, BY MESNE ASSIGNMENTS, OF ONE-HALF TO THE UNIVIS CORPORATION, OF WILMINGTON, DELAWARE, A CORPORATION OF DELAWARE, AND ONE-HALF TO UNITED KINGDOM OPTICAL COMPANY, LIMITED, OF LONDON, ENGLAND

EYEGLASS LENS

Application filed September 16, 1930. Serial No. 482,235.

My invention relates to eye glass lens.

It is a particular object of my invention to provide an eye glass lens in which there shall be a long distance portion and a near distance portion, it being possible to see on all sides of the near distance portion through the long distance portion.

It is a further and particular object to provide in such an arrangement such a juncture between the near distance and long distance portions that the eye in passing from one to the other will not be disturbed by any prismatic effect. By my invention I eliminate prismatic displacement and distortion of the vision. I provide adequate vertical and lateral field of vision and ample control of the optical center of the insert. I am able to provide a wider area on either side of the insert for long distance vision and particularly eliminate prismatic displacement and distortion of the vision on either side of the insert which has heretofore been a disadvantage when the eye moves laterally for a vision on either side of the insert, or through the insert in moving from one area to the other.

Referring to the drawing.

Figure 1:
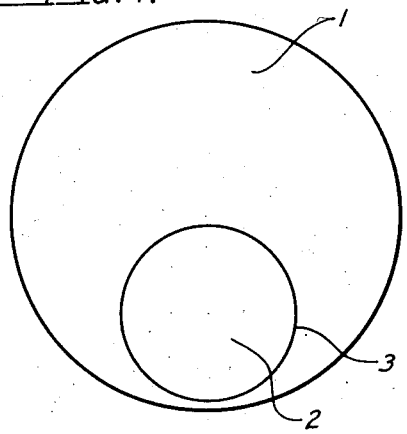
Figure 1 is a top plan view of the main lens with the countersink ground in the upper surface.

Referring to the drawing in detail, 1 indicates a major lens constituting the distance portion of the combination which has ground in the surface thereof a depression 2 having a spherical surface and a circular outline 3. The distance portion of the lens is ordinarily formed of crown glass.

Figure 2:
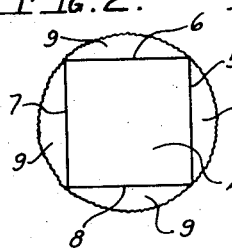
Figure 2 is a plan view of the insert segment prior to mounting upon the main lens.
Figure 8:
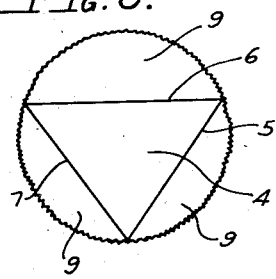
Figure 8 is a plan view of a modified insert utilizing a triangular near vision glass.
Figure 4:
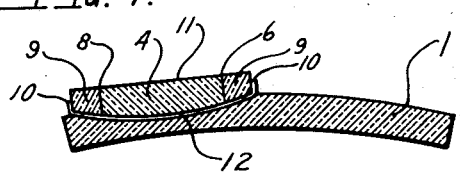
Figure 4 is a section on the line 4—4 of Figure 3.
Figure 3:
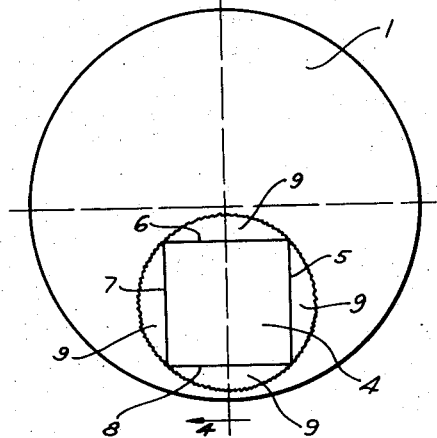
Figure 3 shows in plan the main lens with the insert segment in position prior to fusing.
Figure 6:
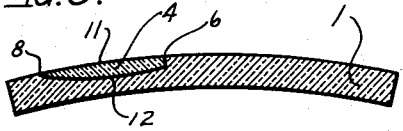
Figure 6 is a section on the line 6—6 of Figure 5.
Figure 7:
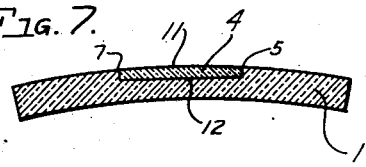
Figure 7 is a section on the line 7—7 of Figure 5.

Referring to the insert, it is composed of a central portion 4 of flint glass having the flat sides 5, 6, 7 and 8 forming a square or rectangle, or a triangle, as indicated in the modification of Figure 8. Fused to each one of the walls 5, 6, 7 and 8 is a section of crown glass 9 which comprises a portion of a circular piece of glass cut along a chord that corresponds to the edges 5, 6, 7 or 8. Piece 9 is fused to the piece 4 so that the insert is a circular body having a central portion of flint glass for near distance vision and an external portion of crown glass which is adapted to fuse with and disappear in the crown glass major lens 1, upon the fusing of the insert with the major lens. For this purpose the insert shown in Figure 2 is mounted as in Figure 3 upon the main lens 1 and is suitably held in position by the feelers 10 and the clamp 11.

The back of the insert is suitably ground with the same curvature as that constituting the bottom 2 of the receiving depression in the main lens 1. This curved back is indicated at 12.

Figure 5:
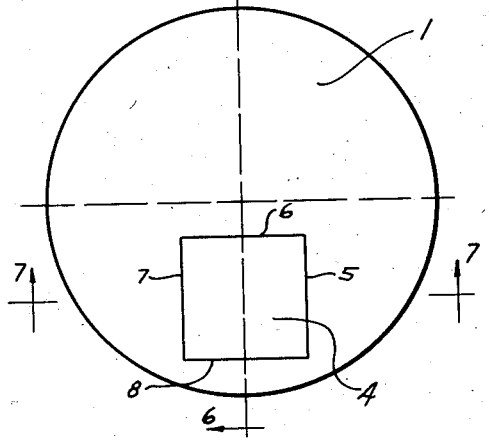
Figure 5 is a plan view of the finished lens.
Figure 9:
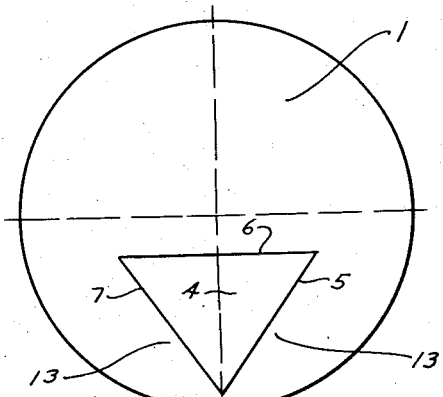
Figure 9 is a plan view of the complete lens with the triangular insert.

After fusing it will be observed as in Figure 5 and in Figure 9 that the crown glass portions of the insert have completely disappeared into each crown glass distance vision lens so that a square or rectangle insert is formed, all edges of which are so arranged that there will be no prismatic displacement or distortion of the vision upon the passage from one portion of the lens to the other.

In Figure 8 and Figure 9 are shown the segments of the finished lens respectively of a modified form of this invention where maximum width of the top of the insert and maximum depth are desired while at the same time the maximum of long distance vision may be secured in the areas marked 13 for long distance vision as in the case of those who may operate machinery by observing an instrument board, but who must look on either side of the instrument board at a distance. The narrow objective of the instrument board can be viewed through the triangular insert with the minimum impedance of the long distance vision.

It will be further understood that in the form shown in Figures 1 to 7 I provide a lens that is particularly adaptable where it is desired to have the vertical and horizontal dimensions of the insert the same, but where it is desired to prevent displacement and distortion on any side of the lens while at the same time providing adequate long distance vision and control of the optical centers depending upon the prescription that is written.

It will be understood that I desire to comprehend within my invention such modifications as may be clearly embraced within the scope of my claims and invention.

Having thus fully described my invention, what I claim as new and desire to secure by Letters Patent, is:

1. In a lens, a long distance portion of one kind of glass having a circular depression with a spherical bottom, an insert having one portion of one kind of glass with straight walls, and sides, top and bottom of another kind of glass similar to the long distance portion fused thereto to form a circular body for insertion in said circular depression whereby upon fusing of the insert in the main lens the glass of the same kind will fuse one into the other.

2. In combination, a main lens for distance vision having a circular depression for receiving an insert, a circular insert comprised of a portion of glass of the same kind as the main lens and another portion of different kind of glass for near vision fused together as a unitary insert, said near vision portion having a flat top parallel to the major axis of the main lens and straight side walls.

3. In combination, a main lens for distance vision having a circular depression for receiving an insert, a circular insert comprised of a portion of glass of the same kind as the main lens and another portion of different kind of glass for near vision fused together as a unitary insert, said near vision portion having a flat top parallel to the major axis of the main lens and straight side walls, the outside diameter of said insert being of similar size to that of the circular depression of the main lens and that portion of the insert outside of the near vision glass being formed of the same glass as that of the main lens.

4. In combination in a lens, a distance vision main lens having an insert receiving depression, an insert fused therein comprising a body of the same shape and general size as the said depression having a portion of near vision glass with a flat top and a flat bottom and straight side walls at right angles thereto, the remainder of the insert being formed of distance vision glass whereby the complete lens will have an insert with flat top, flat bottom and side walls at right angles thereto.

5. In combination, a main lens of one glass having a circular depression with a spherical bottom, an insert of the same outside diameter in the depression and having a cooperating engaging face of the same curvature, said insert comprising a near vision portion of another glass with a flat top, flat bottom and straight side walls at an angle to said top and bottom, the remainder of the insert being formed of the same glass as the distance lens.

In testimony whereof, I affix my signature.

HARRY A. TOULMIN, Jr.